Figure 1:
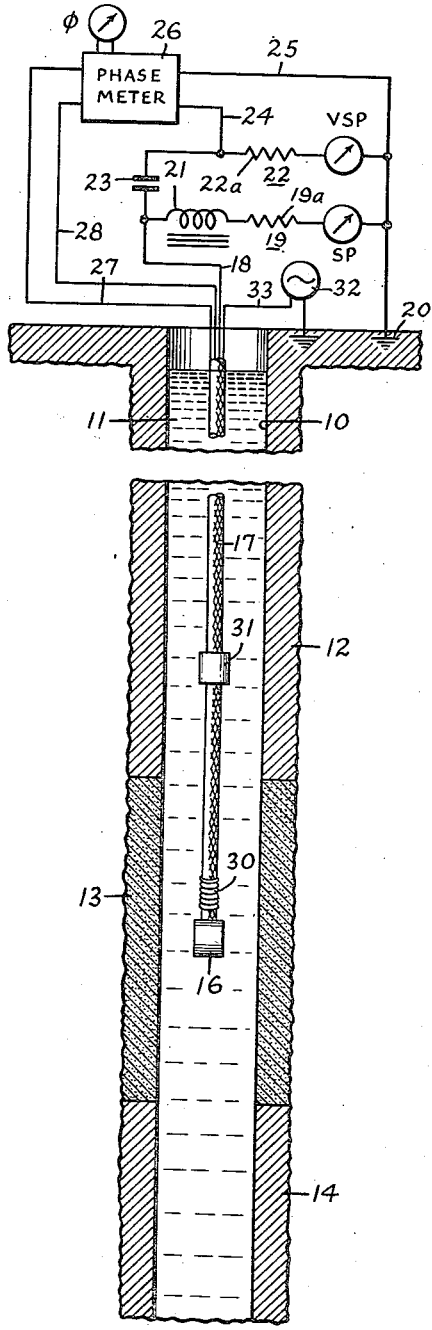

Nov. 19, 1957

HENRI-GEORGES DOLL 2,814,017

METHODS FOR LOGGING THE FORMATIONS
TRAVERSED BY A BOREHOLE

Filed May 26, 1953

INVENTOR.
HENRI-GEORGES DOLL
BY
HIS ATTORNEYS.

United States Patent Office 2,814,017
Patented Nov. 19, 1957

2,814,017

METHODS FOR LOGGING THE FORMATIONS TRAVERSED BY A BOREHOLE

Henri-Georges Doll, Ridgefield, Conn., assignor, by mesne assignments, to Schlumberger Well Surveying Corporation, Houston, Tex., a corporation of Texas Application May 26, 1953, Serial No. 357,544

8 Claims. (Cl. 324—1)

The present invention relates to methods for logging the formations traversed by a bore hole, and more particularly to novel logging methods for simultaneously locating permeable formations and determining the relative or actual permeabilities of such formations.

In present oil field practice, the location and vertical extent of permeable formations traversed by a bore hole are readily determined by electrical logging methods. However, the degree of permeability of such formations may be determined only by expensive and time-consuming core analysis or, under favorable conditions, by calculations based on electrical logs. Accordingly, it is a primary object of the present invention to provide novel methods for obtaining indications of the relative or actual permeabilities of the formations traversed by a bore hole.

Another object of the present invention is to provide novel logging methods for locating permeable formations and simultaneously determining the relative or actual permeabilities of such formations.

A further object of the present invention is to provide novel methods of obtaining continuous indications during a logging operation of the permeabilities of formations traversed by a bore hole.

The invention is based in part on the electrokinetic phenomena of electrofiltration and electro-osmosis, which involve the flow of fluid in a capillary such as a permeable medium and an electro-motive force in the vicinity thereof. As explained in my prior Patent No. 2,433,746, issued December 30, 1947, for "Method and Apparatus for Investigating Earth Formations Traversed by Bore Holes," an electromotive force (electro-filtration potential) is produced by electrofiltration when fluid is caused to flow through a permeable medium. Conversely, the phenomenon of electro-osmosis causes fluid to flow through a fluid-containing, permeable medium when an electromotive force is established in proper relation to the medium.

If periodic pressure waves are passed through earth formations, the fluid filling the interconnected pores in permeable formations will be forced to move in an oscillatory manner. For pressure waves of a given repetition rate or frequency, the motion of the fluid is controlled by the viscosity of the fluid and by its inertia. The effect of the viscosity of the fluid motion is in phase with the applied pressure waves; that is, the relative fluid viscosity will control the component of fluid motion in phase with the pressure wave. On the other hand, the effect of the inertia on the fluid motion is 90° out of phase with the applied pressure waves; that is, the relative fluid inertia will control the component of fluid motion 90° out of phase with the applied pressure waves. However, the actual effect of the viscosity on fluid motion is a function of the permeability of the formation in question. Thus, for a plurality of earth formations of different permeabilities but containing fluid of the same viscosity and inertia, the differences in phase between the respective oscillatory fluid motions and the pressure waves of given frequency producing such fluid motions will be a function of the relative permeabilities of such formations.

The above-described oscillatory motion of the fluid in permeable formations will generate a periodically varying electrofiltration potential in phase with the fluid motion. Since the phase of the fluid motion relatively to the pressure wave creating said motion is a function of the formation permeability, the phase of the alternating electrofiltration potential relatively to the pressure wave will also be a function of the formation permeability.

If, instead of pressure waves, a periodically varying electric current is passed through the formations, the fluid in the interconnected pores of permeable formations will be forced to move in an oscillatory manner. In turn, the oscillatory fluid motion will generate periodic pressure waves. As in the preceding case, the phase difference between the pressure waves and the alternating electric field at substantially the same level will be a function of the permeability of the formation material at that level.

According to the invention, the permeability of earth formation material is investigated by obtaining indications of the phase displacement between periodically varying pressure waves in such material and a periodically varying electromotive force in electro-kinetic relation therewith. In one embodiment, periodic pressure waves are produced in the formations traversed by a bore hole and indications are obtained of the phase displacement between the periodic pressure waves and any periodically varying electrofiltration potentials produced by any oscillatory motion of fluid in the pores of permeable formations resulting from the pressure waves.

In another embodiment, a periodically varying electric field is established in the formations and indications are obtained of the phase displacement between the electric field and any periodic pressure waves resulting from oscillatory movement of fluid in the pores of permeable formations caused by the phenomenon of electro-osmosis.

The phase angle in each embodiment, while being a direct function of the permeability of the formations, is also a function of the frequency of the motion-generating waves (periodic pressure waves or periodically varying electric field), and of the viscosity of the fluid in the permeable formations. The viscosity of the fluid in the formations (usually water) will generally be known, and is a function of temperature which is known. In any event, for qualitative determinations, the exact viscosity is not important.

The frequency should be selected to give the maximum rate of variation of phase angle for formations in a permeability range of interest. It will be understood that at very low frequencies, the viscosity effect will predominate so that the phase angle between the pressure waves and the periodically varying electric waves will be small. On the other hand, at very high frequencies, the inertia effect will be dominant insofar as the motion of the fluid is concerned, and thus, the phase angle will not vary appreciably from 90° with variations in permeability. Therefore, it is advisable to select a frequency such that, for a given fluid in the permeable formations and for the range of permeabilities to be covered, the phase angle will vary within large limits.

It can be shown that the critical frequency is given approximately by the relation $$f_c = 20{,}000\mu/KF$$

where $f_c$ is the critical frequency of the motion-generating waves in cycles per second, $\mu$ is the viscosity of the formation fluid in centipoises, $K$ is the formation permeability in Darcys, and $F$ is the formation factor as determined by electrical logs, for example. Thus, if $\mu=0.2$ centipoise (corresponding to water at about 140° C.), $K=1$ Darcy, and $F=10$, $f_c$ will be on the order of 400 cycles/second.

Since the minimum permeability of commercially important formations is in the neighborhood of 0.025 Darcy, and the maximum viscosity of the water is about 0.7 centipoise, the maximum critical frequency of interest will be about 55,000 cycles/second. The lowest critical frequency will be about 130 cycles/second when the permeabilitiy is 3 Darcys (about the maximum observed in practice) and the viscosity is 0.2 centipoise. For the foregoing, a formation factor of 10 is assumed. The actual frequency to be used will depend on the expected permeability and temperature range of the formations of interest. Obviously, fluid motion-generating waves of a plurality of frequencies may be employed simultaneously, or the frequency of the waves may be swept periodically through the frequencies in a given band.

Figure 2:
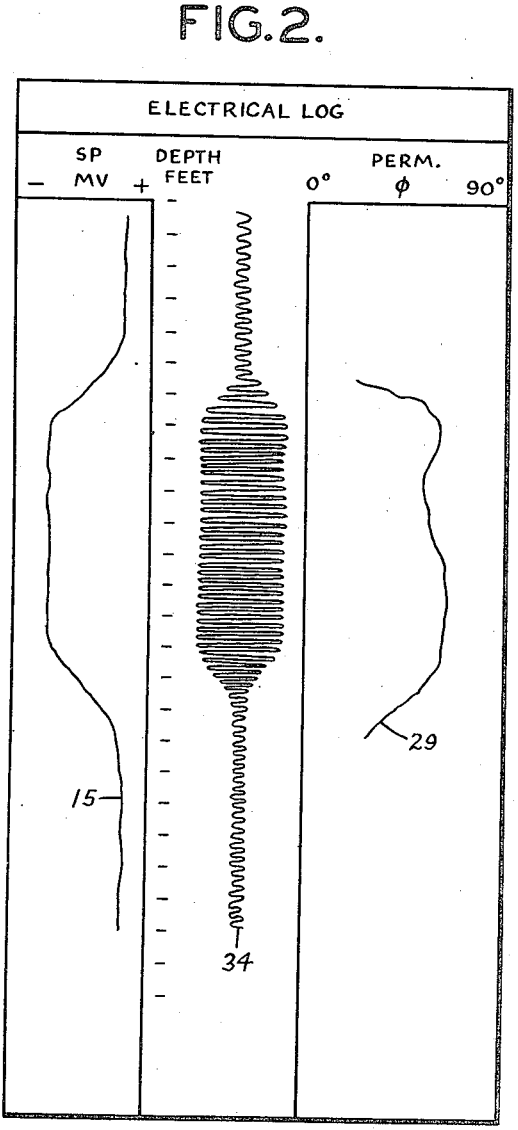

For a better understanding of the invention, reference is made to the following detailed description of a representative embodiment, taken in conjunction with the accompanying drawing in which:

Fig. 1 is a schematic diagram of typical apparatus for investigating the permeability of earth formations traversed by a well in accordance with the present invention; and Fig. 2 is a graph illustrating typical logs that might be obtained with the apparatus shown in Fig. 1.

Referring now to Fig. 1, a bore hole 10 is shown containing an electrolyte such as somewhat salty water, as is usual in so-called cable tool operations, and traversing a plurality of earth formations such as a permeable formation 13 and impervious formations, 12 and 14, for example. Where periodic pressure waves are to be used to produce electrofiltration potentials according to the invention, the bore hole apparatus may include suitable means 31 for generating periodically varying pressure pulses in the bore hole liquid mounted in longitudinally spaced apart relation to an electroacoustic transducer 16 on a supporting cable 17. Conventional means such as the usual cable winch (not shown) may be provided for raising and lowering the cable 17 in the well.

The generating means 31, which may be a mechanical transducer of the type disclosed in my prior Patent No. 2,433,746, or an electroacoustic transducer of the type shown in prior Patent No. 2,451,797 to Blanchard, may be energized from a suitable source of electric energy 32 at the surface. To this end, one terminal of the source 32 may be connected to ground and its other terminal may be connected through a conductor 33 in the cable to the generating means 31, the return circuit being completed through the ground.

The transducer 16, which may be a small underwater microphone, for example, may be connected through the conductors 27 and 28 in the cable 17 to supply one input to a conventional phase meter 26 at the surface of the earth. Preferably, the spacing between the transducer 16 and the generating means 31 should be such that the electric and pressure waves for phase comparison pass substantially longitudinally through the formation at the detection level.

Mounted on the cable 17, preferably at substantially the same level as the transducer 16, is an electrode 30 which may be connected by a conductor 18 in the cable 17 to one side of the parallel connected indicating circuits 19 and 22 for providing indications of spontaneous potentials and periodically varying electrofiltration potentials, respectively, the other side being grounded at the point 20. The spontaneous potential indicating circuit 19 may comprise a recording galvanometer SP and series resistor 19a, a choke 21 being provided to block the passage of periodically varying signals. The circuit 22 may include a recording galvanometer VSP and a series resistor 22a together with a condenser 23 for blocking D. C. and permitting A. C. to pass to the galvanometer. The periodically varying signal between the junction of the resistor 22a and the condenser 23 and the ground 20 is fed through the conductors 24 and 25 as a second input to the phase meter 26.

In operation, periodic pressure pulses are created in the bore hole liquid by the generating means 31. In passing through a permeable formation such as the formation 13, these pressure pulses produce periodically varying electrofiltration potentials which are picked up by the electrode 30 and recorded by the galvanometer VSP as a function of depth in the bore hole. The curve 34 in Fig. 2 illustrates a typical log that might be recorded by the galvanometer VSP in the vicinity of the permeable formation 13 of Fig. 1. At the same time, the galvanometer SP may record a conventional spontaneous potential log as a function of depth in the bore hole, as represented by the curve 15 in Fig. 2.

Indications of the phase displacement between the periodically varying electrofiltration potentials and the correspondingly varying pressure pulses at substantially the same level in the bore hole are provided, according to the invention, by the phase meter 26. The latter is preferably designed to record a log of the difference in phase between the A. C. output of the microphone 16 and the A. C. modulation of the spontaneous potential at substantially the same level as a function of the depth of the microphone 16 and the electrode 30 in the bore hole, as represented by the curve 29 in Fig. 2.

Obviously, when the bore hole apparatus is opposite a substantially impermeable formation, no alternating potential due to electrofiltration in the formation will exist between the electrode 30 and the ground 20, substantially all of any alternating signal that may be present being a result of noise produced, for example, by movement of particles in the drilling fluid 11. Preferably, therefore, the phase meter 26 is so biased that no phase angle is measured when the signal inputs are below a given level. Hence, the log 29 will not only show the locations of the permeable formations but will also provide indications of their comparative permeabilities.

As stated, an alternating electric field may be employed to produce oscillatory movement of the fluid in permeable formations, giving rise to periodic pressure waves in the bore hole. To this end, the generating means 31 may be an electrode which is adapted to receive alternating current from the source 32 at the surface. In this embodiment, the electrode 30 picks up the alternating potential in the bore hole which is fed as an input to the phase meter 26, while the microphone 16 responds to the periodic pressure waves produced by oscillatory motion of the fluid in permeable formations and supplies a second input to the phase meter 26.

Where alternating current is passed through the formations and the bore hole apparatus is opposite a substantially impermeable formation, no periodic pressure waves will be created in the formation by electro-osmosis and any signal picked up by the microphone 16 will be merely noise. However, since the phase meter 26 is preferably so biased that it does not respond when the signals are below a given level, such noise will not appear on the log 29. The log, therefore, will enable the permeable formations to be located and will also provide indications of their relative permeabilities.

If the fluid viscosity of a given formation is known, the microphone 16 and electrode 30 may be lowered opposite such formation and the actual permeability determined by either of the methods described above. For example, the apparatus may be calibrated at a given frequency opposite formations of known permeability, fluid viscosity, and formation factor, and subsequent runs at the given frequency compared with the calibration.

If the bore hole 10 is filled with drilling mud so that there is formed on the surfaces of the permeable formations a substantial mud cake which would tend to damp the periodic pressure waves, it will be apparent that mechanical pressure or electric current waves of increased amplitude will be required. Alternatively, means may be provided for penetrating the mud cake to facilitate transmission of the waves from the source to the formations and/or from the formations to the signal detecting means.

From the foregoing, it will be understood that the invention provides novel and highly effective methods and means for investigating permeable formations traversed by a bore hole. By obtaining indications of the difference in phase between periodic pressure waves and related alternating potentials involving electro-kinetic phenomena, the permeable formations may readily be located and their relative permeabilities may be estimated.

The above-described illustrative embodiments of the invention are obviously susceptible of modification without departing from the scope of the invention. For example, other means may be employed for creating mechanical pressure waves in the bore hole such as, for example, a pumping system of the type disclosed in the prior Patent No. 2,550,005. Pressure waves may also be created by the forces generated by a magnetic field. Further, other forms of apparatus may be used to practice the novel methods disclosed herein, as will be apparent to those skilled in the art. The invention, therefore, is not to be limited to the representative forms disclosed but its scope is defined in the following claims.

I claim:

1. In a method for investigating the permeability of earth formations, the steps of establishing in a permeable formation containing fluid in the pores thereof one of two electrokinetic phenomena involving, respectively, (1) creating periodically varying mechanical pressure in the formation to produce therein electric potential of the same periodicity which is a function of the permeability of the formation, and (2) creating periodically varying electric potential in the formation to produce therein varying mechanical pressure of the same periodicity which is a function of the permeability of the formation, and obtaining indications of the difference in phase between the pressure and the potential in the electrokinetic phenomenon so established.

2. In a method for investigating the permeability of earth formations, the steps of passing periodically varying pressure waves through a formation so as to cause periodically varying electrofiltration potentials to be generated therein, and obtaining indications of the difference in phase between said pressure waves and said potentials.

3. In a method for investigating the permeability of earth formations, the steps of passing periodically varying current through a formation so as to cause periodically varying pressure waves to be generated therein, and obtaining indications of the difference in phase between said current and said pressure waves.

4. In a method for investigating the permeability of earth formations traversed by a borehole, the steps of establishing in the permeable, fluid-containing formation surrounding a borehole one of two electrokinetic phenomena involving, respectively, (1) creating periodically varying mechanical pressure in the formation to produce therein electric potential of the same periodicity which is a function of the permeability of the formation, and (2) creating periodically varying electric potential in the formation to produce therein varying mechanical pressure of the same periodicity which is a function of the permeability of the formation, and obtaining indications of the difference in phase between the pressure and the potential in the electrokinetic phenomenon so established.

5. In a method for investigating the permeability of earth formations traversed by a bore hole, the steps of establishing in the bore hole periodically varying pressure waves, picking up at a location in the vicinity of said pressure waves in the bore hole electrical signals having substantially the same periodicity as said pressure waves and attributable thereto, and obtaining indications of the difference in phase between said pressure waves and said electrical signals.

6. In a method for investigating the permeability of earth formations traversed by a bore hole, the steps of establishing in the bore hole a periodically varying electric field, picking up at a location in the vicinity of said electric field in the bore hole periodically varying pressure waves having substantially the same periodicity as said electric field and attributable thereto, and obtaining indications of the difference in phase between said electric field and said pressure waves.

7. In a method for investigating the permeability of earth formations traversed by a bore hole containing a column of liquid, the steps of generating periodically varying pressure waves at one depth in a bore hole, detecting at a location in fixed nearby space relation to said one depth said pressure waves and electrical signals having substantially the same periodicity as said pressure waves and attributable thereto, obtaining indications of any difference in phase between said detected pressure waves and electrical signals, and repeating said steps at different depths in the bore hole.

8. In a method for investigating the permeability of earth formations traversed by a bore hole containing a column of liquid, the steps of generating an alternating electric field at one depth in a bore hole, detecting at a location in fixed nearby space relation to said one depth alternating electric signals and periodically varying pressure waves produced by said electric field, obtaining indications of the difference in phase between said detected alternating electric signals and pressure waves, and repeating said steps at different depths in the bore hole.

No references cited.